United States Patent
Kanamarlapudi et al.

(10) Patent No.: US 11,870,583 B2
(45) Date of Patent: Jan. 9, 2024

(54) TECHNIQUES FOR POLL BIT TRIGGER ENHANCEMENT IN A WIRELESS COMMUNICATION SYSTEM

(71) Applicant: QUALCOMM Incorporated, San Diego, CA (US)

(72) Inventors: Sitaramanjaneyulu Kanamarlapudi, San Diego, CA (US); Leena Zacharias, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/162,981

(22) Filed: Jan. 29, 2021

(65) Prior Publication Data

US 2021/0242972 A1    Aug. 5, 2021

Related U.S. Application Data

(60) Provisional application No. 62/968,625, filed on Jan. 31, 2020.

(51) Int. Cl.
*H04L 1/1607* (2023.01)
*H04L 5/00* (2006.01)
(Continued)

(52) U.S. Cl.
CPC .......... *H04L 1/1685* (2013.01); *H04L 5/0055* (2013.01); *H04L 69/322* (2013.01); *H04W 28/06* (2013.01)

(58) Field of Classification Search
CPC ... H04L 1/1685; H04L 5/0055; H04L 69/322; H04W 28/06
See application file for complete search history.

(56) References Cited

U.S. PATENT DOCUMENTS

| 2006/0251105 A1* | 11/2006 | Kim | H04L 1/189 370/449 |
| 2008/0130619 A1* | 6/2008 | Cha | H04L 1/1877 370/346 |

(Continued)

OTHER PUBLICATIONS

3GPP TSG-RAN WG2 Meeting #99bis Prague, Czech Republic, Oct. 9-13, 2017, Source: Huawei, HiSilicon, Title: Remaining issues for polling in NR RLC, Document for: Discussion and Decision (R2-1710215, Resubmission of R2-1709661) (Year: 2017).*

(Continued)

*Primary Examiner* — Edan Orgad
*Assistant Examiner* — Malick A Sohrab
(74) *Attorney, Agent, or Firm* — Arun Swain

(57) ABSTRACT

Aspects described herein relate to POLL timer enhancement in fifth generation new radio (5G NR). In an example, the aspects may include determining whether a count of packet data unit (PDU) without POLL associated with a current PDU sequence satisfies a threshold for maximum PDUs without POLL; determining whether a total transmission queue memory exceeds an uplink transmission queue memory threshold; generating a POLL bit based on a determination that the PDU without POLL count associated with the current PDU without POLL in-sequence satisfies the threshold for maximum PDUs without POLL and the total transmission queue memory exceeds the threshold for uplink transmission queue memory; and transmitting, to a network entity, the current PDU with the POLL bit.

31 Claims, 7 Drawing Sheets

(51) Int. Cl.
*H04L 69/322* (2022.01)
*H04W 28/06* (2009.01)

(56) References Cited

U.S. PATENT DOCUMENTS

| | | | | |
|---|---|---|---|---|
| 2009/0028126 | A1* | 1/2009 | Meylan | H04L 1/1812 |
| | | | | 370/346 |
| 2010/0085880 | A1* | 4/2010 | Torsner | H04L 43/06 |
| | | | | 370/252 |
| 2020/0059324 | A1* | 2/2020 | Martin | H04L 1/187 |
| 2020/0205224 | A1* | 6/2020 | Lee | H04W 28/065 |
| 2021/0075548 | A1* | 3/2021 | Shi | H04W 80/02 |

OTHER PUBLICATIONS https://web.archive.org/web/20191211080138/https://plato.stanford.edu/entries/disjunction/ (Year: 2019).*
https://web.archive.org/web/20200120222104/https://en.wikipedia.org/wiki/Logical_disjunction (Year: 2020).*
Huawei, et al., "Remaining Issues for Polling in NR RLC", 3GPP TSG-RAN WG2 Meeting #99bis, 3GPP Draft; R2-1710215, 3rd Generation Partnership Project (3GPP), Mobile Competence Centre; 650, Route Des Lucioles; F-06921 Sophia-Antipolis Cedex; France, vol. RAN WG2, No. Prague, Czech Republic; Oct. 9, 2017-Oct. 13, 2017, 5 Pages, Sep. 29, 2017 (Sep. 29, 2017), XP051354785.
International Search Report and Written Opinion—PCT/US2021/015963—ISA/EPO—dated Apr. 21, 2021.

* cited by examiner

TECHNIQUES FOR POLL BIT TRIGGER ENHANCEMENT IN A WIRELESS COMMUNICATION SYSTEM

CROSS-REFERENCE TO RELATED APPLICATION(S)

The present application claims benefit of U.S. Provisional Application No. 62/968,625 entitled "TECHNIQUES FOR POLL BIT TRIGGER ENHANCEMENT IN A WIRELESS COMMUNICATION SYSTEM" filed Jan. 31, 2020, which is assigned to the assignee hereof and hereby expressly incorporated by reference herein.

BACKGROUND

Aspects of the present disclosure relate generally to wireless communication systems, and more particularly, to POLL bit trigger enhancement in fifth generation new radio (5G NR).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, some implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE), including determining whether a count of packet data unit (PDU) without POLL associated with a current PDU sequence satisfies a threshold for maximum PDUs without POLL; determining whether a total transmission queue memory exceeds an uplink transmission queue memory threshold; generating a POLL bit based on a determination that the PDU without POLL count associated with the current PDU without POLL in-sequence satisfies the threshold for maximum PDUs without POLL and the total transmission queue memory exceeds the threshold for uplink transmission queue memory; and transmitting, to a network entity, the current PDU with the POLL bit.

In another aspect, an apparatus for wireless communication is provided that includes a transceiver, a memory configured to store instructions, and one or more processors communicatively coupled with the transceiver and the memory. The one or more processors are configured to execute the instructions to determine whether a count of PDU without POLL associated with a current PDU sequence satisfies a threshold for maximum PDUs without POLL; determine whether a total transmission queue memory exceeds an uplink transmission queue memory threshold; generate a POLL bit based on a determination that the PDU without POLL count associated with the current PDU without POLL in-sequence satisfies the threshold for maximum PDUs without POLL and the total transmission queue memory exceeds the threshold for uplink transmission queue memory; and transmit, to a network entity, the current PDU with the POLL bit.

In another aspect, an apparatus for wireless communication is provided that includes means for determining whether a count of PDU without POLL associated with a current PDU sequence satisfies a threshold for maximum PDUs without POLL; means for determining whether a total transmission queue memory exceeds an uplink transmission queue memory threshold; means for generating a POLL bit based on a determination that the PDU without POLL count associated with the current PDU without POLL in-sequence satisfies the threshold for maximum PDUs without POLL and the total transmission queue memory exceeds the threshold for uplink transmission queue memory; and means for transmitting, to a network entity, the current PDU with the POLL bit.

In yet another aspect, a non-transitory computer-readable medium is provided including code executable by one or more processors to determine whether a count of PDU without POLL associated with a current PDU sequence satisfies a threshold for maximum PDUs without POLL; determine whether a total transmission queue memory exceeds an uplink transmission queue memory threshold; generate a POLL bit based on a determination that the PDU without POLL count associated with the current PDU without POLL in-sequence satisfies the threshold for maximum PDUs without POLL and the total transmission queue memory exceeds the threshold for uplink transmission queue memory; and transmit, to a network entity, the current PDU with the POLL bit.

Another example implementation includes a method of wireless communication at a network entity, including receiving, from a UE, a current PDU with a POLL bit configured to trigger reporting of a status PDU at a peer acknowledgement mode (AM) radio link control (RLC) entity associated with the network entity; and transmitting, to the UE, the status PDU in response to receiving the current PDU with the POLL bit, the status PDU configured to acknowledge one or more received RLC service data unit (SDU) segments.

In another aspect, an apparatus for wireless communication is provided that includes a transceiver, a memory configured to store instructions, and one or more processors communicatively coupled with the transceiver and the memory. The one or more processors are configured to execute the instructions to receive, from a UE, a current PDU with a POLL bit configured to trigger reporting of a status PDU at a peer AM RLC entity associated with the network entity; and transmit, to the UE, the status PDU in response to receiving the current PDU with the POLL bit, the status PDU configured to acknowledge one or more received RLC SDU segments.

In another aspect, an apparatus for wireless communication is provided that includes means for receiving, from a UE, a current PDU with a POLL bit configured to trigger reporting of a status PDU at a peer AM RLC entity associated with the network entity; and means for transmitting, to the UE, the status PDU in response to receiving the current PDU with the POLL bit, the status PDU configured to acknowledge one or more received RLC SDU segments.

In yet another aspect, a non-transitory computer-readable medium is provided including code executable by one or more processors to receive, from a UE, a current PDU with a POLL bit configured to trigger reporting of a status PDU at a peer AM RLC entity associated with the network entity; and transmit, to the UE, the status PDU in response to receiving the current PDU with the POLL bit, the status PDU configured to acknowledge one or more received RLC SDU segments.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
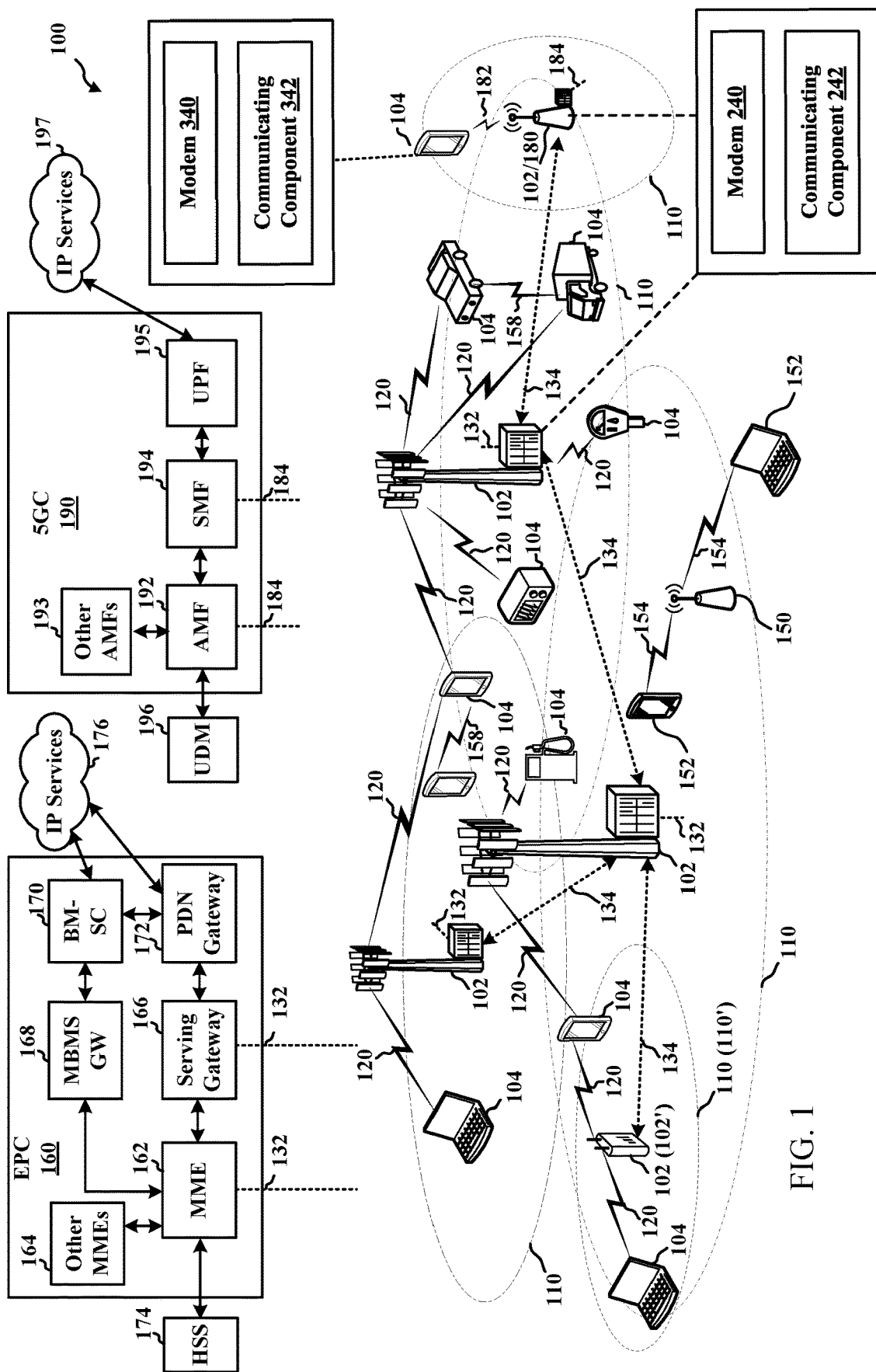
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to POLL bit trigger enhancement in fifth generation new radio (5G NR). For example, a radio link control (RLC) layer may configure various Poll Triggers to enable a transmitter to query the successful reception of the transmitted packet data units (PDUs) from a receiver. When one or more triggers are met, the UE may trigger a POLL by setting the POLL bit in an outgoing PDU. In an example, an acknowledgement mode (AM) AM RLC entity may poll its peer AM RLC entity in order to trigger STATUS reporting at the peer AM RLC entity.

In an aspect, whenever in-sequence PDUs without Poll cross more than N number of packets or the corresponding bytes without Poll cross more than Y number of bytes, the RLC may introduce a POLL bit. Accordingly, the STATUS PDU may be received from the receiver and allows the transmitter to free the acknowledged PDUs and free some memory. In an example, POLL may be introduced for every N number of packets or Y number of bytes or the configured infinity of pollPDU and pollByte may be overwritten to some value M and X respectively, so that whenever in-sequence PDUs without Poll cross more than M number of packets or the corresponding bytes without Poll cross more than X number of bytes, the RLC may introduce a POLL bit artificially:

rlc-Config am:
  {
    ul-AM-RLC
    {
      sn-FieldLength size18,
      t-PollRetransmit ms300,
      pollPDU infinity,
      pollByte infinity,
      maxRetxThreshold t8
    }, However, based on an AM window size when using an 18 bit sequence number (SN) for the PDUs, it is possible to have large values of PDUs demanding large memory requirements for the UEs. For example, if the POLL bit is only triggered when the AM window size is full, then the memory may need to store 131072 PDUs without POLL, when RLC AM SN of 18 bits is used. This memory requirement becomes too large when a 1500B IP packet is commonly used.

The present disclosure relates generally to current issues of POLL bit trigger enhancement. In an aspect, the present disclose includes a method, apparatus, and non-statutory computer readable medium for wireless communications for determining whether a count of PDU without POLL associated with a current PDU sequence satisfies a threshold for maximum PDUs without POLL; determining whether a total transmission queue memory exceeds a threshold for uplink transmission queue memory; generating a POLL bit based on a determination that the count of PDU without POLL associated with the current PDU sequence satisfies the threshold for maximum PDUs without POLL and the total transmission queue memory exceeds the threshold for uplink transmission queue memory; and transmitting, to a network entity, the current PDU with the POLL bit.

In another implementation, the present disclosure includes receiving, from a UE, a current PDU with a POLL bit configured to trigger reporting of a status PDU at a peer acknowledgement mode (AM) radio link control (RLC) entity associated with the network entity; and transmitting, to the UE, the status PDU in response to receiving the current PDU with the POLL bit, the status PDU configured to acknowledge one or more received RLC service data unit (SDU) segments.

The described features will be presented in more detail below with reference to FIGS. 1-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as base station 102/gNB 180, may have a modem 240 and communicating component 242 for receiving one or more PDUs with a POLL bit, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for generating and transmitting a POLL bit with one or more PDUs, as described herein. Though a UE 104 is shown as having the modem 340 and communicating component 342, this is one illustrative example, and substantially any node or type of node may include a modem 340 and communicating component 342 for providing corresponding functionalities described herein.

In an aspect, some nodes such as UE 104 of the wireless communication system may determine whether to introduce a POLL bit into one or more PDUs scheduled for transmission. For example, the UE 104 and/or communicating component 342 may be configured for determining whether a count of PDU without POLL associated with a current PDU sequence satisfies a threshold for maximum PDUs without POLL; determining whether a total transmission queue memory exceeds a threshold for uplink transmission queue memory; generating a POLL bit based on a determination that the count of PDU without POLL associated with the current PDU sequence satisfies the threshold for maximum PDUs without POLL and the total transmission queue memory exceeds the threshold for uplink transmission queue memory; and transmitting, to a network entity, the current PDU with the POLL bit.

In an aspect, a network entity, such as base station 102/gNB 180, may be triggered based on receiving a PDU with a POLL bit. For example, the base station 102/gNB 180 may be configured to receiving, from a UE, a current PDU with a POLL bit configured to trigger reporting of a status PDU at a peer acknowledgement mode (AM) radio link control (RLC) entity associated with the network entity; and transmitting, to the UE, the status PDU in response to receiving the current PDU with the POLL bit, the status PDU configured to acknowledge one or more received RLC service data unit (SDU) segments.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Turning now to FIGS. 2-7, aspects are depicted with reference to one or more components and one or more methods that may perform the actions or operations described herein, where aspects in dashed line may be optional. Although the operations described below in FIG. 9 is presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
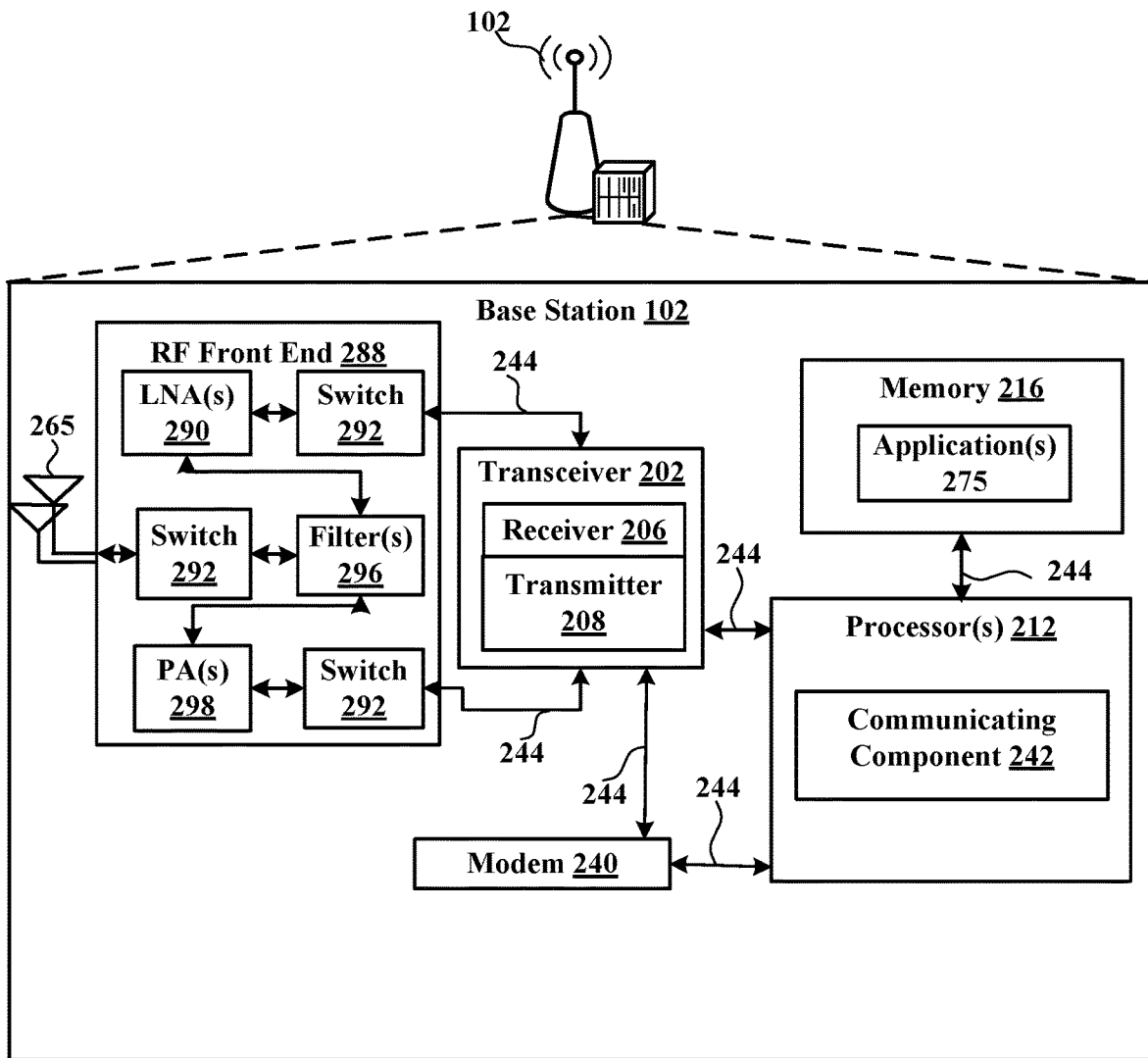
FIG. 2 is a block diagram illustrating an example of a network entity (also referred to as a base station), in accordance with various aspects of the present disclosure.

Referring to FIG. 2, one example of an implementation of a node acting as an IAB node, such as base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 for beam configurations based on QCL indications.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212.

Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIGS. 4 and 6. Similarly, the memory 216 may correspond to the memory described in connection with the UE in FIG. 7.

Figure 3:
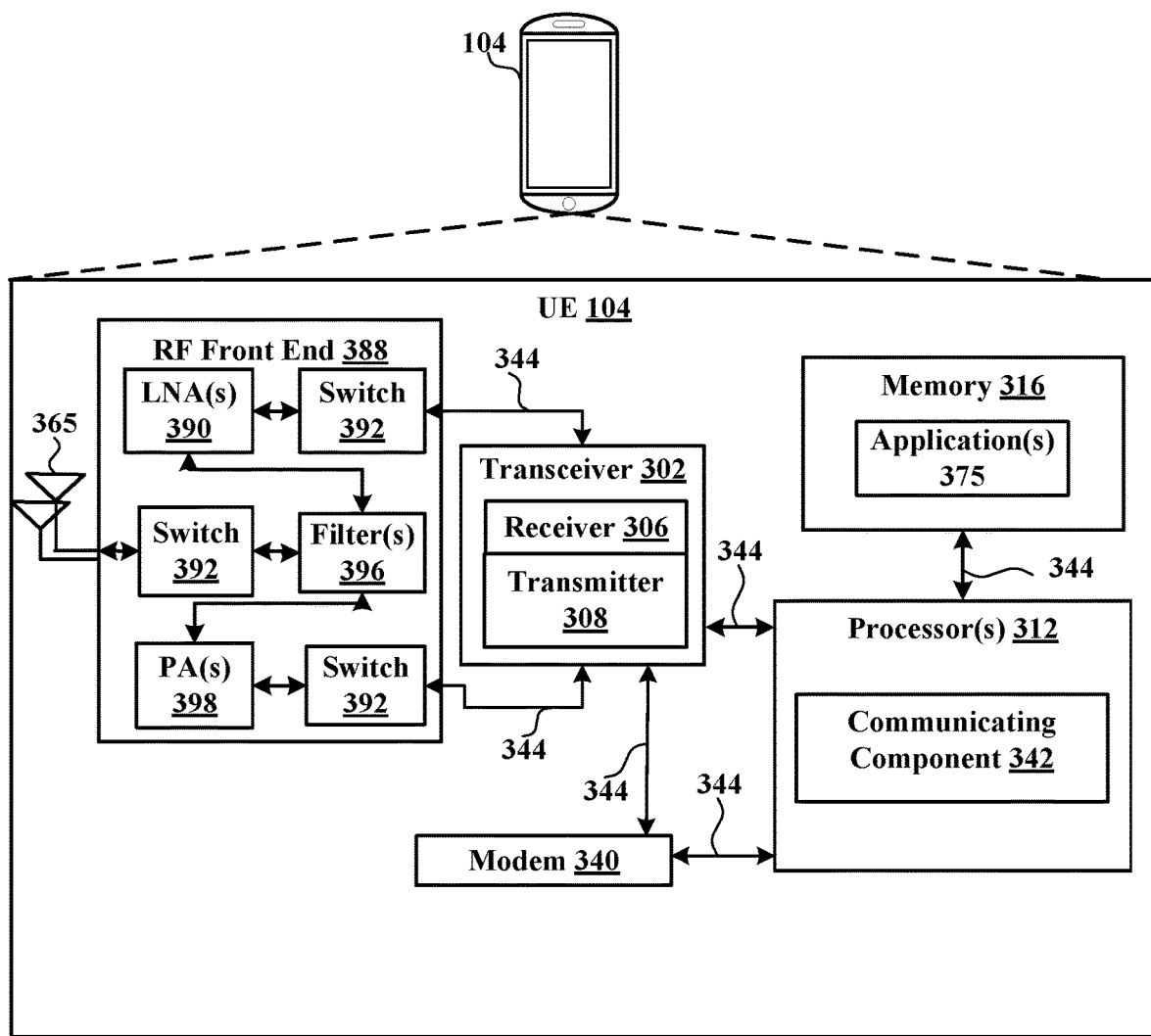
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 7. Similarly, the memory 316 may correspond to the memory described in connection with the base station in FIG. 7.

Figure 4:
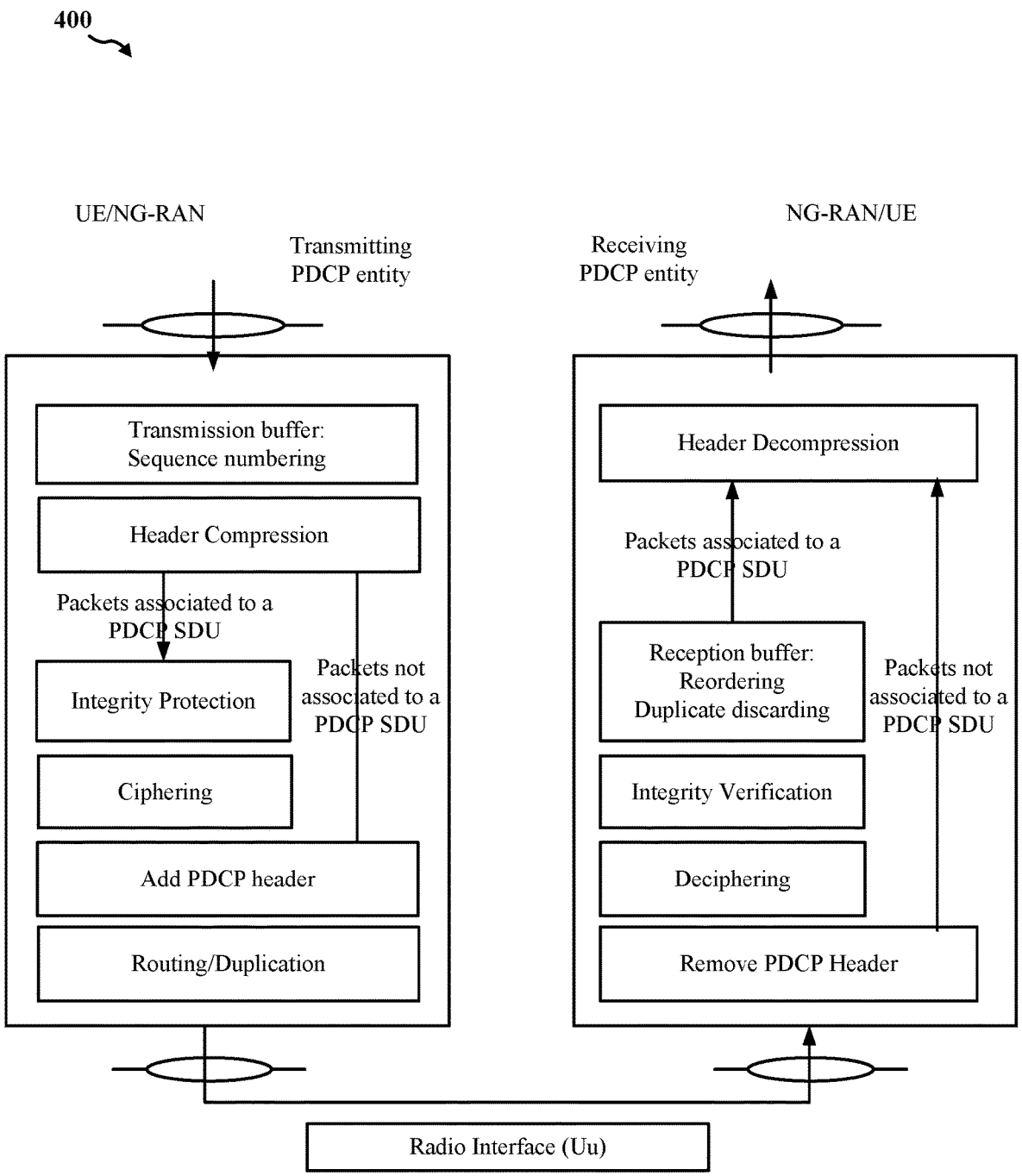
FIG. 4 is a diagram illustrating an example flow at a packet data convergence protocol (PDCP) layer.

FIG. 4 is diagram 400 illustrating an example flow at a packet data convergence protocol (PDCP) layer. For example, diagram 400 illustrates a flow sequence from a transmitting PDCP entity, e.g., a UE, such as UE 104, to a receiving PDCP entity, e.g., a network entity, such as base station 102.

In an aspect, the transmitting PDCP entity may include a transmission buffer with sequence numbering and header compression. For example, packets that are associated to a PDCP SDU are then sent to integrity protection, ciphering, adding of PDCP header, and routing/duplication before being transmitted via a radio interface (Uu) to the receiving PDCP entity. In another example, packets that are not associated to a PDCP SDU skip the integrity protection and ciphering and move directly to adding of the PDCP header and routing/duplication.

In an aspect, packets are received at the PDCP entity via the radio interface, and then the PDCP header is removed. For example, packets that are associated to a PDCP SDU are deciphered, integrity verified and sent to a reception buffer where reordering and duplicate discarding may occur before header decompression occurs. In another example, packets that are not associated to a PDCP SDU are sent directly towards header decompression.

In an aspect, an AM RLC entity may poll a peer AM RLC entity in order to trigger STATUS reporting at the peer AM RLC entity. For example, upon notification of a transmission opportunity by lower layer, for each AMD PDU submitted for transmission such that the AMD PDU includes either a not previously transmitted RLC SDU or an RLC SDU segment containing not previously transmitted byte segment, the transmitting side of an AM RLC entity shall increment PDU_WITHOUT_POLL by one; increment BYTE_WITHOUT_POLL_by every new byte of Data field element that it maps to the Data field of the AMD PDU; if PDU_WITHOUT_POLL is greater than or equal to pollPDU; or if BYTE_WITHOUT_POLL is greater than or equal to pollByte (include a poll in the AMD PDU).

In an aspect, upon notification of a transmission opportunity by lower layer, for each AMD PDU submitted for transmission, the transmitting side of an AM RLC entity may if both the transmission buffer and the retransmission buffer becomes empty (excluding transmitted RLC SDUs or RLC SDU segments awaiting acknowledgements) after the transmission of the AMD PDU; or if no new RLC SDU can be transmitted after the transmission of the AMD PDU (e.g. due to window stalling) (include a poll in the AMD PDU). For example, empty RLC buffer (excluding transmitted RLC SDUs or RLC SDU segments awaiting acknowledgements) should not lead to unnecessary polling when data awaits in the upper layer.

Figure 5:
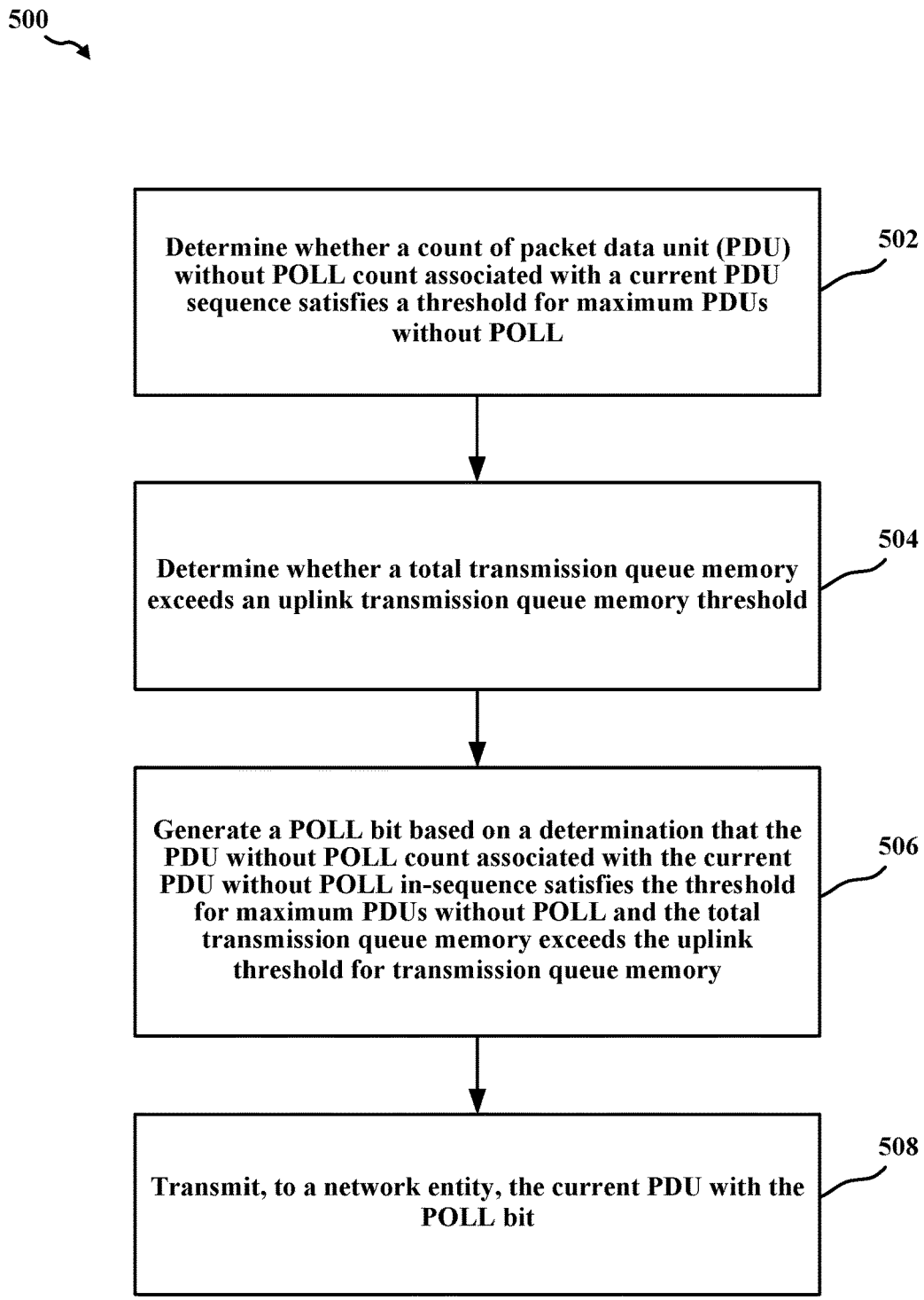
FIG. 5 is a flowchart of a method of wireless communication, and more specifically POLL bit trigger enhancement at a UE.

FIG. 5 illustrates a flow chart of an example of a method 500 for wireless communication at a UE, and more specifically POLL bit trigger enhancements at a UE. In an example, a UE 104 can perform the functions described in method 500 using one or more of the components described in FIGS. 1, 2, 3, and 7.

At block 502, the method 500 may determine whether a count of PDU without POLL associated with a current PDU sequence satisfies a threshold for maximum PDUs without POLL. In an aspect, the communicating component 342, e.g., in conjunction with processor(s) 312, memory 316, and/or transceiver 302, may be configured to determine whether a count of PDU without POLL associated with a current PDU sequence satisfies a threshold of maximum PDUs without POLL. In one example, the PDUs can be associated with a Logical Channel that determines a priority level. Thus, the UE 104, the processor(s) 312, the communicating component 342 or one of its subcomponents may define the means for determining whether a count of PDU without POLL associated with a current PDU sequence satisfies a threshold for maximum PDUs without POLL. For example, in an aspect, the UE 104 and/or the communication component 342 may receive a signal, determine whether a count of PDU without POLL associated with a current PDU sequence satisfies a threshold for maximum PDUs without POLL, and/or performs other signal processes such as described above with respect to FIG. 3.

At block 504, the method 500 may determine whether a total transmission queue memory exceeds a threshold for uplink transmission queue memory. In an aspect, the communicating component 342, e.g., in conjunction with processor(s) 312, memory 316, and/or transceiver 302, may be configured to determine whether a total transmission queue memory exceeds a threshold for uplink transmission queue memory. Thus, the UE 104, the processor(s) 312, the communicating component 342 or one of its subcomponents may define the means for determining whether a total transmission queue memory exceeds a threshold for uplink transmission queue memory. For example, in an aspect, the UE 104 and/or the communication component 342 may receive a signal, determine whether a total transmission queue memory exceeds a threshold for uplink transmission queue memory, and/or performs other signal processes such as described above with respect to FIG. 3.

At block 506, the method 500 may generate a POLL bit based on a determination that the count of PDU without POLL associated with the current PDU sequence satisfies the threshold for maximum PDUs without POLL and the total transmission queue memory exceeds the threshold for uplink transmission queue memory. In an aspect, the communicating component 342, e.g., in conjunction with processor(s) 312, memory 316, and/or transceiver 302, may be configured to generate a POLL bit based on a determination that the count of PDU without POLL associated with the current PDU sequence satisfies the threshold for maximum PDUs without POLL and the total transmission queue memory exceeds the threshold for uplink transmission queue memory. Thus, the UE 104, the processor(s) 312, the communicating component 342 or one of its subcomponents may define the means for generating a POLL bit based on a determination that the count of PDU without POLL associated with the current PDU sequence satisfies the threshold for maximum PDUs without POLL and the total transmission queue memory exceeds the threshold for uplink transmission queue memory. For example, in an aspect, the UE 104 and/or the communication component 342 may receive a signal, generate a POLL bit, and/or performs other signal processes such as described above with respect to FIG. 3.

At block 508, the method 500 may transmit, to a network entity, the current PDU with the POLL bit. In an aspect, the communicating component 342, e.g., in conjunction with processor(s) 312, memory 316, and/or transceiver 302, may be configured to transmit, to a network entity, the current PDU with the POLL bit. Thus, the UE 104, the processor(s) 312, the communicating component 342 or one of its subcomponents may define the means for transmitting, to a network entity, the current PDU with the POLL bit. For example, in an aspect, the UE 104 and/or the communication component 342 may process a signal, transmit the current PDU with the POLL bit, and/or performs other signal processes such as described above with respect to FIG. 3.

In some aspects, the communicating component 342, e.g., in conjunction with processor(s) 312, memory 316, and/or transceiver 302 may be configured to receive, from the network entity, a status PDU in response to transmitting the current PDU with the POLL bit.

In some aspects, the POLL bit triggers reporting of the status PDU at a peer acknowledgement mode (AM) radio link control (RLC) entity associated with the network entity.

In some aspects, the status PDU is configured to acknowledge or negatively acknowledge one or more received radio link control (RLC) service data unit (SDU) segments.

In some aspects, the communicating component 342, e.g., in conjunction with processor(s) 312, memory 316, and/or transceiver 302 may be configured to increment the count of PDU without POLL based on a determination that at least the count of PDU without POLL associated with the current PDU sequence fails to satisfy the threshold for maximum PDUs without POLL or the total transmission queue memory fails to exceed the threshold for uplink transmission queue memory; and transmitting the current PDU without POLL bit.

In some aspects, the communicating component 342, e.g., in conjunction with processor(s) 312, memory 316, and/or transceiver 302 may be configured to determine the threshold for maximum packet without POLL bit the transmission queue memory.

In some aspects, the count of PDU without POLL corresponds to a number of sequentially transmitted PDUs without a POLL bit included.

In some aspects, each of the sequentially transmitted PDUs include a sequence number (SN).

In some aspects, each of the sequentially transmitted PDUs correspond to an acknowledgement mode (AM) radio link control (RLC) PDU.

In some aspects, the total transmission queue memory corresponds to an amount of data associated with a number of sequentially transmitted PDUs that is stored in a memory of a transmission queue.

Figure 6:
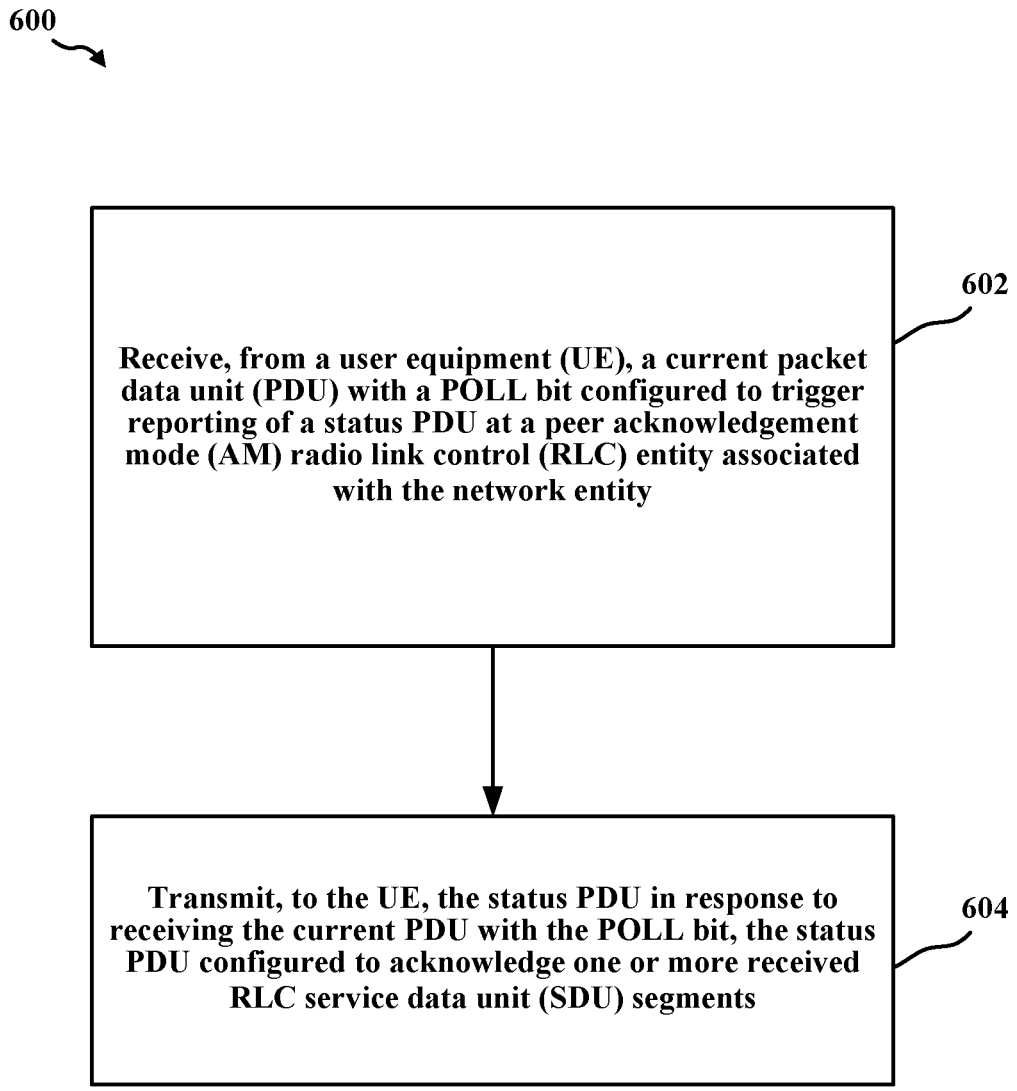
FIG. 6 is a flowchart of another method of wireless communication, and more specifically POLL bit trigger enhancement at a network entity.

FIG. 6 illustrate a flow chart of an example of a method 600 for wireless communication at a node, which may be an network entity, and more specifically POLL bit trigger enhancements at the network entity. In an example, a base station 102 can perform the functions described in method 600 using one or more of the components described in FIGS. 1, 2, 3, and 7.

At block 602, the method 600 may receive, from a UE, a current PDU with a POLL bit configured to trigger reporting of a status PDU at a peer AM RLC entity associated with the network entity. In an aspect, the communicating component 242, e.g., in conjunction with processor(s) 212, memory 216, and/or transceiver 202, may be configured to receive, from a UE, a current PDU with a POLL bit configured to trigger reporting of a status PDU at a peer AM RLC entity associated with the network entity. In one example, the data can be associated with a priority level. Thus, the base station 102, the processor(s) 212, the communicating component 242 or one of its subcomponents may define the means for receiving, from a UE, a current PDU with a POLL bit configured to trigger reporting of a status PDU at a peer AM RLC entity associated with the network entity. For example, in an aspect, the base station 102 and/or the communication component 242 may receive a signal, process the signal into a current PDU, and/or performs other signal processes such as described above with respect to FIG. 2.

At block 604, the method 600 may transmit, to the UE, the status PDU in response to receiving the current PDU with the POLL bit, the status PDU configured to acknowledge or negatively acknowledge one or more received RLC SDU segments. In an aspect, the communicating component 242, e.g., in conjunction with processor(s) 212, memory 216, and/or transceiver 202, may be configured to transmit, to the UE, the status PDU in response to receiving the current PDU with the POLL bit, the status PDU configured to acknowledge or negatively acknowledge one or more received RLC SDU segments. Thus, the base station 102, the processor(s) 212, the communicating component 242 or one of its subcomponents may define the means for transmitting, to the UE, the status PDU in response to receiving the current PDU with the POLL bit, the status PDU configured to acknowledge or negatively acknowledge one or more received RLC SDU segments. For example, in an aspect, the base station 102 and/or the communication component 242 may process a signal into a status PDU, transmit the status PDU, and/or performs other signal processes such as described above with respect to FIG. 2.

In some aspects, the communicating component 242, e.g., in conjunction with processor(s) 212, memory 216, and/or transceiver 202 may be configured to receive the current PDU without POLL bit.

In some aspects, a count of PDU without POLL corresponds to a number of sequentially transmitted PDUs without a POLL bit included.

In some aspects, each of the sequentially transmitted PDUs include a SN.

In some aspects, each of the sequentially transmitted PDUs correspond to an AM RLC PDU.

Figure 7:
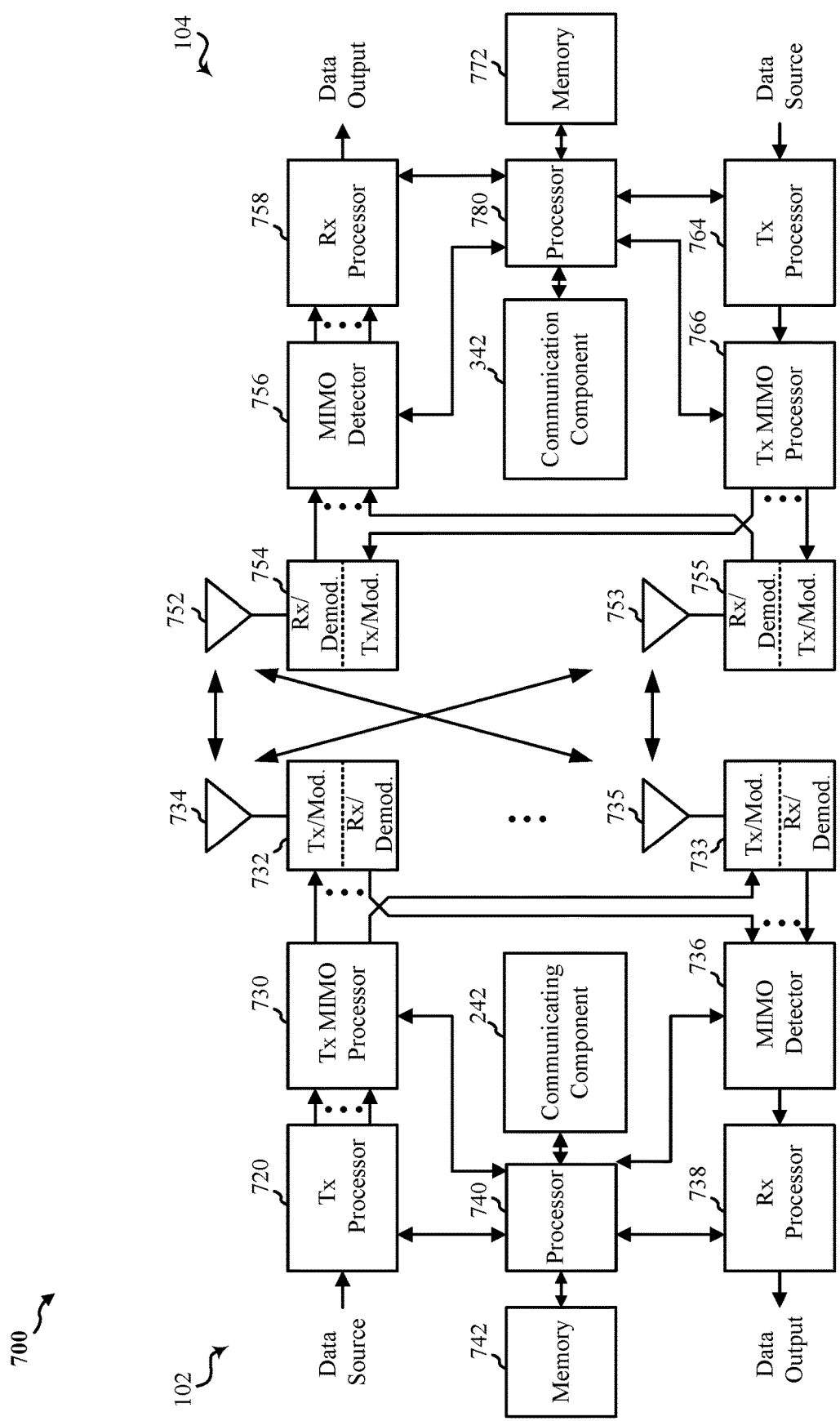
FIG. 7 is a block diagram illustrating an example of a MIMO communication system including a base station and a UE, in accordance with various aspects of the present disclosure.

FIG. 7 is a block diagram of a MIMO communication system 700 including a base station 102, which may be acting as an IAB node or a parent node, and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 74 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

Some Further Example Clauses

Implementation examples are described in the following numbered clauses:

1. A method of wireless communication at a user equipment (UE), comprising:
   determining whether a count of packet data unit (PDU) without POLL associated with a current PDU sequence satisfies a threshold for maximum PDUs without POLL;
   determining whether a total transmission queue memory exceeds an uplink transmission queue memory threshold;
   generating a POLL bit based on a determination that the PDU without POLL count associated with the current PDU without POLL in-sequence satisfies the threshold for maximum PDUs without POLL and the total transmission queue memory exceeds the threshold for uplink transmission queue memory; and
   transmitting, to a network entity, the current PDU with the POLL bit.
2. The method of any preceding clause, further comprising receiving, from the network entity, a status PDU in response to transmitting the current PDU with the POLL bit.
3. The method of any preceding clause, wherein the POLL bit triggers reporting of the status PDU at a peer acknowledgement mode (AM) radio link control (RLC) entity associated with the network entity.
4. The method of any preceding clause, wherein the status PDU is configured to acknowledge or negatively acknowledge one or more received radio link control (RLC) service data unit (SDU) segments.
5. The method of any preceding clause, further comprising:
   incrementing the count of PDU without POLL based on a determination that at least the count of PDU without POLL associated with the current PDU sequence fails to satisfy the threshold for maximum PDUs without POLL or the total transmission queue memory fails to exceed the threshold for uplink transmission queue memory; and
   transmitting the current PDU without POLL bit.
6. The method of any preceding clause, further comprising determining the threshold for the transmission queue memory.
7. The method of any preceding clause, wherein the count of PDU without POLL corresponds to a number of sequentially transmitted PDUs without a POLL bit included.
8. The method of any preceding clause, wherein each of the sequentially transmitted PDUs include a sequence number (SN).
9. The method of any preceding clause, wherein each of the sequentially transmitted PDUs correspond to an acknowledgement mode (AM) radio link control (RLC) PDU.
10. The method of any preceding clause, wherein the total transmission queue memory corresponds to an amount of data associated with a number of sequentially transmitted PDUs transmitted that is stored in a memory of a transmission queue.
11. A method of wireless communication at network entity, comprising:
    receiving, from a user equipment (UE), a current packet data unit (PDU) with a POLL bit configured to trigger reporting of a status PDU at a peer acknowledgement mode (AM) radio link control (RLC) entity associated with the network entity; and
    transmitting, to the UE, the status PDU in response to receiving the current PDU with the POLL bit, the status PDU configured to acknowledge or negatively acknowledge one or more received RLC service data unit (SDU) segments.
12. The method of any preceding clause, further comprising receiving the current PDU without POLL bit.
13. The method of any preceding clause, wherein a count of PDU without POLL corresponds to a number of sequentially transmitted PDUs without a POLL bit included.
14. The method of any preceding clause, wherein each of the sequentially transmitted PDUs include a sequence number (SN).
15. The method of any preceding clause, wherein each of the sequentially transmitted PDUs correspond to an AM RLC PDU.
16. An apparatus for wireless communication at a user equipment (UE), comprising:
    a transceiver;
    a memory configured to store instructions; and
    one or more processors communicatively coupled with the transceiver and the memory, wherein the one or more processors are configured to execute the instructions to:
      determine whether a count of packet data unit (PDU) without POLL associated with a current PDU sequence satisfies a threshold for maximum PDUs without POLL;

determine whether a total transmission queue memory exceeds an uplink transmission queue memory threshold;

generate a POLL bit based on a determination that the PDU without POLL count associated with the current PDU without POLL in-sequence satisfies the threshold for maximum PDUs without POLL and the total transmission queue memory exceeds the threshold for uplink transmission queue memory; and transmit, to a network entity, the current PDU with the POLL bit.

17. The apparatus of any preceding clause, wherein the one or more processors are configured to receive, from the network entity, a status PDU in response to transmitting the current PDU with the POLL bit.

18. The apparatus of any preceding clause, wherein the POLL bit triggers reporting of the status PDU at a peer acknowledgement mode (AM) radio link control (RLC) entity associated with the network entity.

19. The apparatus of any preceding clause, wherein the status PDU is configured to acknowledge or negatively acknowledge one or more received radio link control (RLC) service data unit (SDU) segments.

20. The apparatus of any preceding clause, wherein the one or more processors are configured to:

increment the count of PDU without POLL based on a determination that at least the count of PDU without POLL associated with the current PDU sequence fails to satisfy the threshold for maximum PDUs without POLL or the total transmission queue memory fails to exceed the threshold for uplink transmission queue memory; and transmit the current PDU without POLL bit.

21. The apparatus of any preceding clause, wherein the one or more processors are configured to determine the threshold for the transmission queue memory.

22. The apparatus of any preceding clause, wherein the count of PDU without POLL corresponds to a number of sequentially transmitted PDUs without a POLL bit included.

23. The apparatus of any preceding clause, wherein each of the sequentially transmitted PDUs include a sequence number (SN).

24. The apparatus of any preceding clause, wherein each of the sequentially transmitted PDUs correspond to an acknowledgement mode (AM) radio link control (RLC) PDU.

25. The apparatus of any preceding clause, wherein the total transmission queue memory corresponds to an amount of data associated with a number of sequentially transmitted PDUs transmitted that is stored in a memory of a transmission queue.

26. An apparatus for wireless communication at a network entity, comprising:

a transceiver;

a memory configured to store instructions; and one or more processors communicatively coupled with the transceiver and the memory, wherein the one or more processors are configured to execute the instructions to:

receive, from a user equipment (UE), a current packet data unit (PDU) with a POLL bit configured to trigger reporting of a status PDU at a peer acknowledgement mode (AM) radio link control (RLC) entity associated with the network entity; and transmit, to the UE, the status PDU in response to receiving the current PDU with the POLL bit, the status PDU configured to acknowledge or negatively acknowledge one or more received RLC service data unit (SDU) segments.

27. The apparatus of any preceding clause, wherein the one or more processors are configured to receive the current PDU without POLL bit.

28. The apparatus of any preceding clause, wherein a count of PDU without POLL corresponds to a number of sequentially transmitted PDUs without a POLL bit included.

29. The apparatus of any preceding clause, wherein each of the sequentially transmitted PDUs include a sequence number (SN).

30. The apparatus of any preceding clause, wherein each of the sequentially transmitted PDUs correspond to an AM RLC PDU.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication at a user equipment (UE), comprising:
   generating a POLL bit in response to a determination that a packet data unit (PDU) without POLL count associated with a current PDU sequence satisfies a threshold for maximum PDUs without POLL and a determination that a total transmission queue memory exceeds an uplink transmission queue memory threshold; and
   transmitting, to a network entity, the current PDU with the POLL bit.

2. The method of claim 1, further comprising receiving, from the network entity, a status PDU in response to transmitting the current PDU sequence with the POLL bit.

3. The method of claim 2, wherein the POLL bit triggers reporting of the status PDU at a peer acknowledgement mode (AM) radio link control (RLC) entity associated with the network entity.

4. The method of claim 2, wherein the status PDU is configured to acknowledge or negatively acknowledge one or more received radio link control (RLC) service data unit (SDU) segments.

5. The method of claim 1, further comprising:
   incrementing the count of PDU without POLL based on a determination that at least the count of PDU without POLL associated with the current PDU sequence fails to satisfy the threshold for maximum PDUs without POLL or the total transmission queue memory fails to exceed the uplink transmission queue memory threshold; and
   transmitting the current PDU without POLL bit.

6. The method of claim 1, further comprising selecting the uplink transmission queue memory threshold.

7. The method of claim 1, wherein the count of PDU without POLL corresponds to a number of sequentially transmitted PDUs without a POLL bit included.

8. The method of claim 7, wherein each of the sequentially transmitted PDUs include a sequence number (SN).

9. The method of claim 7, wherein each of the sequentially transmitted PDUs correspond to an acknowledgement mode (AM) radio link control (RLC) PDU.

10. The method of claim 1, wherein the total transmission queue memory corresponds to an amount of data associated with a number of sequentially transmitted PDUs transmitted that is stored in a memory of a transmission queue.

11. The method of claim 1, wherein the total transmission queue memory corresponds to an amount of data for transmitting and excludes transmitted PDUs awaiting acknowledgements.

12. A method of wireless communication at network entity, comprising:
    receiving, from a user equipment (UE), a current packet data unit (PDU) with a POLL bit configured to trigger reporting of a status PDU at a peer acknowledgement mode (AM) radio link control (RLC) entity associated with the network entity; and
    transmitting, to the UE, the status PDU in response to receiving the current PDU with the POLL bit, the status PDU configured to acknowledge or negatively acknowledge one or more received RLC service data unit (SDU) segments,
    the current PDU with the POLL bit being sent in response to the UE determining that a PDU without POLL count associated with the current PDU satisfies a threshold for maximum PDUs without POLL and a total transmission queue memory of the UE exceeds an uplink transmission queue memory threshold.

13. The method of claim 12, further comprising receiving the current PDU without POLL bit.

14. The method of claim 13, wherein a count of PDU without POLL corresponds to a number of sequentially transmitted PDUs without a POLL bit included.

15. The method of claim 14, wherein each of the sequentially transmitted PDUs include a sequence number (SN).

16. The method of claim 14, wherein each of the sequentially transmitted PDUs correspond to an AM RLC PDU.

17. An apparatus for wireless communication at a user equipment (UE), comprising:
- a transceiver;
- a memory configured to store instructions; and
- one or more processors communicatively coupled with the transceiver and the memory, wherein the one or more processors are configured to execute the instructions to:
  - generate a POLL bit in response to a determination that a packet data unit (PDU) without POLL count associated with a current PDU-sequence satisfies a threshold for maximum PDUs without POLL and a determination that a total transmission queue memory exceeds an uplink transmission queue memory threshold; and
  - transmit, to a network entity, the current PDU with the POLL bit.

18. The apparatus of claim 17, wherein the one or more processors are configured to receive, from the network entity, a status PDU in response to transmitting the current PDU sequence with the POLL bit.

19. The apparatus of claim 18, wherein the POLL bit triggers reporting of the status PDU at a peer acknowledgement mode (AM) radio link control (RLC) entity associated with the network entity.

20. The apparatus of claim 18, wherein the status PDU is configured to acknowledge or negatively acknowledge one or more received radio link control (RLC) service data unit (SDU) segments.

21. The apparatus of claim 17, wherein the one or more processors are configured to:
- increment the count of PDU without POLL based on a determination that at least the count of PDU without POLL associated with the current PDU sequence fails to satisfy the threshold for maximum PDUs without POLL or the total transmission queue memory fails to exceed the uplink transmission queue memory threshold; and
- transmit the current PDU without POLL bit.

22. The apparatus of claim 17, wherein the one or more processors are configured to select the uplink transmission queue memory threshold.

23. The apparatus of claim 17, wherein the count of PDU without POLL corresponds to a number of sequentially transmitted PDUs without a POLL bit included.

24. The apparatus of claim 23, wherein each of the sequentially transmitted PDUs include a sequence number (SN).

25. The apparatus of claim 23, wherein each of the sequentially transmitted PDUs correspond to an acknowledgement mode (AM) radio link control (RLC) PDU.

26. The apparatus of claim 17, wherein the total transmission queue memory corresponds to an amount of data associated with a number of sequentially transmitted PDUs transmitted that is stored in a memory of a transmission queue.

27. An apparatus for wireless communication at a network entity, comprising:
- a transceiver;
- a memory configured to store instructions; and
- one or more processors communicatively coupled with the transceiver and the memory, wherein the one or more processors are configured to execute the instructions to:
  - receiving, from a user equipment (UE), a current packet data unit (PDU) with a POLL bit configured to trigger reporting of a status PDU at a peer acknowledgement mode (AM) radio link control (RLC) entity associated with the network entity; and
  - transmitting, to the UE, the status PDU in response to receiving the current PDU with the POLL bit, the status PDU configured to acknowledge or negatively acknowledge one or more received RLC service data unit (SDU) segments,
- the current PDU with the POLL bit being sent in response to the UE determining that a PDU without POLL count associated with the current PDU satisfies a threshold for maximum PDUs without POLL and a total transmission queue memory of the UE exceeds an uplink transmission queue memory threshold.

28. The apparatus of claim 27, wherein the one or more processors are configured to receive the current PDU without POLL bit.

29. The apparatus of claim 28, wherein a count of PDU without POLL corresponds to a number of sequentially transmitted PDUs without a POLL bit included.

30. The apparatus of claim 29, wherein each of the sequentially transmitted PDUs include a sequence number (SN).

31. The apparatus of claim 29, wherein each of the sequentially transmitted PDUs correspond to an AM RLC PDU.

* * * * *